Patented Sept. 5, 1933

1,925,590

UNITED STATES PATENT OFFICE 1,925,590

PRODUCTION OF ESTERS OF MONOCARBOXYLIC ACIDS AND THEIR DERIVATIVES

Alphons O. Jaeger, Mount Lebanon, Pa., assignor to The Selden Company, Pittsburgh, Pa., a corporation of Delaware No Drawing. Application December 17, 1930
Serial No. 502,983

14 Claims. (Cl. 260—103)

This invention relates to the production of esters of monocarboxylic acids from polycarboxylic acids or anhydrides or from esters of polycarboxylic acids and their derivatives.

According to the present process, phthalic anhydride or other polycarboxylic acids or anhydrides are passed over catalysts which favor splitting of carboxy groups in the presence of alcohol vapors, with or without hydrogen, steam, nitrogen or other inert gases. Instead of passing the vapors of the anhydride or acid and alcohol vapors over the catalyst, the ester of the polycarboxylic acid with the alcohol may be used. Good yields of the esters of the corresponding monocarboxylic acids are obtained, in most cases together with considerable amounts of monocarboxylic acid. Thus, for example, when dimethyl phthalate is used, benzoic acid, methyl benzoate and benzylbenzoate are formed, sometimes contaminated with other products such as benzylphthalate, phthalides, monoalkyl phthalides and occasionally anthracene derivatives.

Contact masses which may be used in the present invention are very numerous, for not only can contact masses containing the ordinary catalysts favoring the splitting off of carboxy groups be used but many substances which have hitherto been supposed to have little or no catalytic power but which are highly porous, such as certain base exchange bodies, silica gel, etched quartz fragments, filter stones, active carbons, are excellent contact masses and probably owe at least part of their activity to their highly porous physical structure. Other contact masses used are of widely varying types including the actual carboxy splitting components, such as oxides of thorium, other rare earths, beryllium, aluminum, cadmium, zirconium, titanium, alkali and alkaline earths, and the like which may be associated with components which are reduction catalysts, dehydration catalysts, dehydrogenation catalysts, or which by their physical character of high porosity or capillarity act as physical catalysts or activators. The non-carboxy-splitting catalysts, such as reduction catalysts, dehydrogenation catalysts, dehydration catalysts and the like are also important.

Among these groups are included those which favor catalytic reduction or hydrogenations, such as compounds or elements of various metals, such as zinc, copper, silver, gold, iron, cobalt, manganese, thallium, lead, metals of the platinum group, tin, and the like. Many of the catalytic components which are carboxy-splitting catalysts favor dehydration and may, therefore, be considered as composite catalysts. In some contact masses it is desirable to include components which are oxidation catalysts such as those containing metal elements of the fifth and sixth groups of the periodic system, such as vanadium, columbium, tantalum, bismuth, manganese, chromium, molybdenum, tungsten, uranium, etc. Salts of the metal acids are very effective.

Metal alloys can also be used as contact masses. Examples are various alloys of iron, such as ferrochrome, ferrotungsten, ferrotitanium, ferromolybdenum, ferrovanadium, ferromanganese, silico-ferromanganese, aluminum-silico-ferromanganese, copper alloys, such as brass, bronze, aluminum bronze, aluminum alloys such as duralumin and the like, alloys containing beryllium, magnesium and the like.

Many minerals containing effective catalytic elements are also of importance as contact masses; thus, for example, titanium minerals such as rutile, ilmenite and the like, may be used, copper ore, zirkite, zircon, minerals containing rare earths, etc. The minerals are frequently of very desirable physical structure and many of them form contact masses equal to and in some cases better than artificial contact masses.

The physical catalysts include all porous and capillary substances, such as kieselguhr, pumice, porous rocks of volcanic or eruptive origin, zeolites, (natural and artificial), non-silicious base exchange bodies, leached derivatives of base exchange bodies such as glaucosil, and the like.

Other advantageous contact masses are the undiluted and especially the diluted base exchange bodies, such as two-component zeolites, which are the reaction products of at least one silicate with one or more metallates or one or more metal salts the basic radicals of which are metals capable of forming part of the non-exchangeable nucleus of a zeolite; multi-component zeolites, that is to say the reaction products of at least one silicate, at least one metallate and at least one salt, the basic radical of which is capable of entering into the non-exchangeable nucleus of a zeolite; non-silicious base exchange bodies and the like; derivatives of base exchange bodies, such as their reaction products with compounds containing acidic radicals capable of reacting with a base exchange body to form salt-like bodies; leached base exchange bodies, etc. Catalytically effective components may be physically associated with the base exchange body or chemically combined therein in exchangeable form, in non-exchangeable form or in the form of acid radicals in salt-like bodies.

In fact, the number of contact masses which can be effectively used in the present reaction is extraordinarily large, and the present invention is not in any sense limited to any particular contact mass, but on the contrary includes all processes of preparing esters of monocarboxylic acids from polycarboxylic acids and alcohol vapors or from esters of polycarboxylic acids, with or without additional gases such as steam, hydrogen, etc. and with any suitable contact mass.

While the choice of contact masses is enormously large, it should be understood that the reaction conditions are not necessarily the same with all contact masses. Thus, for example, contact masses which contain very strong reduction or hydrogenation catalysts, such as some of those containing iron, cobalt, nickel, or palladium, thallium, lead, silver, copper, zinc, gold, etc., must be run at lower temperatures, such as 340-400° C., than those which contain catalysts having other characteristics. It is an advantage of the present invention that the catalytic process is not critical and in general a fairly wide range of temperatures can be used with the same contact mass although, of course, in all cases there is a certain range of temperature which gives optimum results with any particular contact mass. The reaction may take place at elevated temperatures at atmospheric pressure or at pressures above or below that of the atmosphere. It is usually preferable to carry out the reaction in the vapor phase in a circulatory process, removing the reaction products and any unreacted dicarboxylic acid compounds from the circulating gas stream. It is usually also desirable to remove the carbon monoxide or carbon dioxide formed in the reaction, which may be effected by well-known methods. When CO is not removed, larger proportions of aldehydes are obtained. The hydrogen or reducing gases or vapors may then be reused after suitable additions to make up for losses. The circulatory process is desirable because it permits the use of a suitable excess of hydrogen or other reducing gases without waste and it has been found that an excess of reducing gases is favorable for high reaction speeds and good yields.

In addition to reducing gases themselves, other gases or vapors may be present, such as, inert gases such as nitrogen, gases which speed up or slow down the reaction such as carbon dioxide, steam, and the like.

While for many purposes the catalytic transformation of polycarboxylic acids or their esters into monocarboxylic acid esters is most effectively carried out in the vapor phase, the invention is in no sense limited thereto, and on the contrary liquid phase reactions in which the alcohol vapors are passed through liquid or dispersed polycarboxylic acid compounds in the presence of contact masses which may be advantageously suspended therein in finely divided form are of importance. The reactions may take place at atmospheric pressures or at pressures above or below the atmosphere. For best results it is generally desirable to carry out liquid phase reactions at temperatures above room temperature in suitable autoclaves.

In the above description special emphasis has been laid on the treatment of phthalic anhydride or acid and its derivatives such as esters. This specific reaction is perhaps the most important commercially at the present time, but it should be understood that the present invention is applicable to polycarboxylic acid substances of other types, such as, for example, diphenic acid and its derivatives, adipic acid, maleic acid, succinic acid, tartaric acid, etc.

The invention will be described in greater detail in the following specific examples, which set forth a few representative processes, it being understood that the invention is in no sense limited to the specific details herein set forth.

*Example 1*

200 volumes of crushed pumice stone retained on a six-mesh screen are coated with 10 parts by weight of zinc oxide in the form of the hydroxide by dissolving 36.5 parts of zinc nitrate with 6 mols of water in 250 volumes of water, precipitating out the hydroxide with concentrated ammonia, filtering, washing and forming a slurry of the cake in 220 volumes of distilled water. The suspension is sprayed onto the pumice, which is heated. The pumice may advantageously be treated with diluted nitric acid before use and dried.

The contact mass is placed in a converter and a mixture of phthalic anhydride and methyl alcohol in the ratio of 2.95 kilos of phthalic anhydride vapors per 6.75 cbm. of methyl alcohol is passed over the contact mass at temperatures between 350 and 450° C., preferably between 380 and 400° C. Considerable yields of methyl benzoate having a boiling point of 198-200° C. are obtained, together with unesterified benzoic acid. The zinc in the contact mass may be partly or wholly replaced by beryllium, cadmium, boron, aluminum, titanium, zirconium, tin, lead, thorium, cerium and other rare earths. The elements may be present as oxides or salts or other compounds with or without carrier materials. Other elements of the periodic system may also be present in the contact masses and many minerals form excellent contact masses. Examples of such minerals are cryolite, spinel, corundum, topaz, witherite, barite, calcite, magnesite, dolomite, vanadite, apatite, borax, carnallite, feldspar, muscovite, rutile, ilmenite, titanite, zircon, thorite, pyromorphite, and the like.

*Example 2*

12 parts of freshly precipitated aluminum vanadate are suspended in 120 parts of water and then coated onto comminuted unglazed porcelain, for example by spraying the suspension of the aluminum vanadate onto heated porcelain fragments. The contact mass is filled into a converter, and dimethyl or diethyl phthalate vapors mixed with reducing gases such as hydrogen or illuminating gas, together with some steam, in the ratio of 3.5 kilos of dimethyl or diethyl phthalate to 8-10 cbm. of reducing gas, are passed over the contact mass under reaction conditions such as those described in the foregoing example. A product containing methyl benzoate or ethyl benzoate respectively is obtained, together with small amounts of benzaldehyde. Small amounts of steam may be added to the hydrogen, if desired, and good yields are likewise obtained if the hydrogen is eliminated.

The salt used may be partly or wholly replaced by other salts of the metal acids of the fifth or sixth groups of the periodic system, such as columbic, tantalic, bismuthic, chromic, molybdic or tungstic acid. The salts may be present singly or in admixture. The basic radical of the salts may contain one or more of the following elements:—aluminum, beryllium, magnesium, calcium, zinc, strontium, cadmium, barium, copper, silver, titanium, zirconium, tin, lead, iron, cobalt, nickel, manganese. Tin salts of chromic acid are particularly effective. In many cases the contact mass composition may be stabilized by the addition of alkali or alkaline earth metal salts.

Example 3

Polycarboxylic acids may be transformed into monocarboxylic acid esters in the liquid phase. Thus, for example, phthalic anhydride mixed with methyl alcohol and a finely divided catalyst prepared by precipitating 3–5% of copper carbonate in kieselguhr is filled into an autoclave which is preferably lined with aluminum, copper, zinc or alloys of chromium, and heated to 200–250° C. Large amounts of the phthalic anhydride are transformed into benzoic acid and methyl benzoate. Other solvents, such as cyclohexane or tetraline, may be present in addition to the methyl alcohol, and it is sometimes desirable to introduce some hydrogen. The methyl alcohol may be anhydrous or may contain water, it being understood that the present reaction may be carried out in the liquid phase in the presence of water, which of course during the reaction is normally, though not necessarily, present in the gaseous phase.

Instead of using copper as a catalyst, zinc, aluminum, titanium, zirconium, vanadium, thorium, chromium, manganese or cobalt may be present as catalysts, singly or in admixture.

What is claimed as new is:

1. A method of transforming polycarboxylic acid substances into esters of monocarboxylic acids, which comprises bringing about reaction at reaction temperature between a mixture containing a product included in the group consisting of volatile esters of the polycarboxylic acid, mixtures of the polycarboxylic anhydride and a monohydric alcohol together with a non-alcoholic reducing gas in the presence of a carboxy splitting contact mass.

2. A method of transforming polycarboxylic acid substances into esters of monocarboxylic acids, which comprises passing a mixture containing a product included in the group consisting of volatile esters of the polycarboxylic acid, mixtures of the polycarboxylic anhydride and a monohydric alcohol together with a non-alcoholic reducing gas over a carboxy splitting contact mass at reaction temperature.

3. A method of transforming phthalic acid substances into esters of benzoic acid, which comprises bringing about reaction at reaction temperature between a mixture containing a product included in the group consisting of volatile esters of phthalic acid, mixtures of phthalic anhydride and a monohydric alcohol in the presence of a carboxy splitting contact mass.

4. A method of transforming phthalic acid substances into esters of benzoic acid, which comprises passing a mixture containing a product included in the group consisting of volatile esters of phthalic acid, mixtures of phthalic anhydride and a monohydric alcohol over a carboxy splitting contact mass at reaction temperature.

5. A method of transforming phthalic acid substances into esters of benzoic acid, which comprises bringing about reaction at reaction temperature between a mixture containing a product included in the group consisting of volatile esters of phthalic acid, mixtures of phthalic anhydride and a monohydric alcohol together with a non-alcoholic reducing gas in the presence of a carboxy splitting contact mass.

6. A method of transforming phthalic acid substances into esters of benzoic acid, which comprises passing a mixture containing a product included in the group consisting of volatile esters of phthalic acid, mixtures of phthalic anhydride and a monohydric alcohol together with a non-alcoholic reducing gas over a carboxy splitting contact mass at reaction temperature.

7. A method according to claim 1, in which the contact mass contains a zinc compound.

8. A method according to claim 2, in which the contact mass contains a zinc compound.

9. A method according to claim 3, in which the contact mass contains a zinc compound.

10. A method according to claim 4, in which the contact mass contains a zinc compound.

11. A method according to claim 3, in which the mixture contains phthalic anhydride and a monohydric alcohol.

12. A method according to claim 4, in which the mixture contains phthalic anhydride and a monohydric alcohol.

13. A method according to claim 3, in which the mixture contains phthalic anhydride and a monohydric alcohol and the catalyst is any oxy compound of zinc.

14. A method according to claim 4, in which the mixture contains phthalic anhydride and a monohydric alcohol and the catalyst is any oxy compound of zinc.

ALPHONS O. JAEGER.